C. HUTCHINS.
Improvement in Churns.

No. 131,821. Patented Oct. 1, 1872.

Witnesses:
A. Bennerkendorf.
C. Sedgwick.

Inventor:
C. Hutchins
per
Attorneys.

UNITED STATES PATENT OFFICE.

CHARLES HUTCHINS, OF BALDWIN CITY, KANSAS, ASSIGNOR TO HIMSELF AND RYNEAR MORGAN, OF SAME PLACE.

IMPROVEMENT IN CHURNS.

Specification forming part of Letters Patent No. 131,821, dated October 1, 1872.

*To all whom it may concern:*

Figure 1:
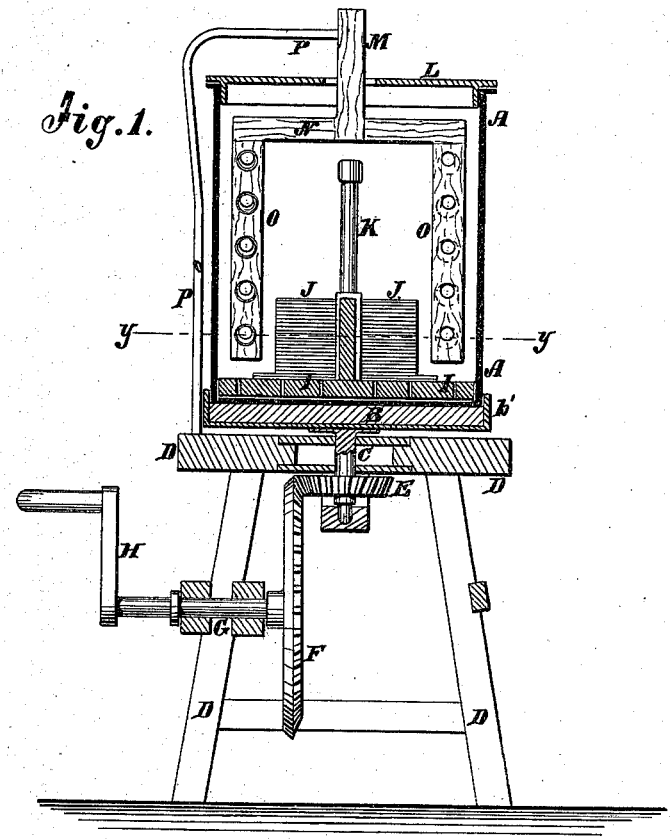
Figure 2:
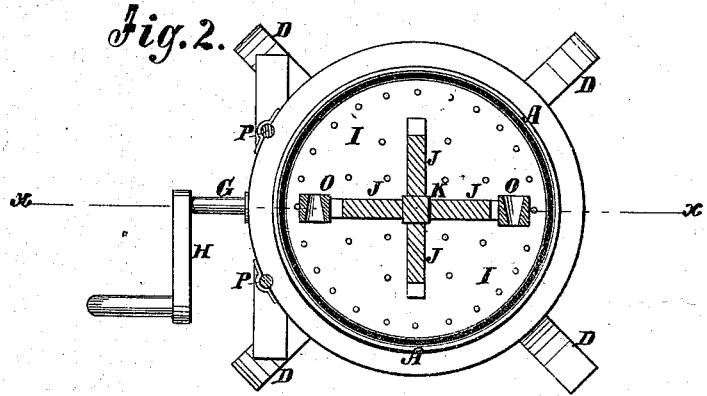

Be it known that I, CHARLES HUTCHINS, of Baldwin City, in the county of Douglas and State of Kansas, have invented a new and useful Improvement in Churn, of which the following is a specification:

In the accompanying drawing, Figure 1 is a detail vertical section of my improved churn taken through the line $x\ x$, Fig. 2, and Fig. 2 is a horizontal section of the same taken through the line $y\ y$, Fig. 1.

Similar letters of reference indicate corresponding parts.

My invention has for its object to furnish an improved churn, simple in construction, convenient in use, and effective in operation, bringing the butter very quickly, developing all the butter that may be in the milk, and producing butter of the first quality by the introduction of air; and it consists in the construction and combination of various parts of the churn, as hereinafter more fully described.

A represents the body of the churn, which is made cylindrical in form. The churn-body A is placed upon a circular board or plate, B, which is made with an upwardly-projecting flange, $b'$, around its outer edge to receive and fit upon the bottom of the churn, so that the plate B may carry the churn with it in its revolution. To the center of the lower side of the plate B is attached the upper end of a short vertical shaft, C, which passes down through a hole in the bench or stand D, and revolves in bearings attached to said bench. To the lower part of the shaft C is attached a bevel-gear wheel, E, the teeth of which mesh into the teeth of the bevel-gear wheel F attached to the horizontal shaft G, which revolves in bearings attached to the frame-work of the bench or stand D, and to the outer end of which is attached the crank H, by means of which the machine is operated. I is a circular plate fitting into the interior of the churn-body A so snugly as to be carried around by and with said churn-body in its revolution. The plate I is perforated with numerous small holes, as shown in Figs. 1 and 2. To the middle part of the upper side of the plate I are attached four (more or less) radial paddles, J, about three inches in height, which, as the churn-body is revolved, throw the milk outward against the sides of the churn. To the center of the plate I is attached an upright, K, having a knob or handle upon its upper end for convenience in raising the plate I out of the churn-body A, when desired. L is the cover, in the center of which is formed a hole for the passage of the bar M, to the lower end of which, just below the cover L, is attached a cross-bar, N. To the ends of the cross-bar N are attached the upper ends of the bars O, which project downward along the inner surface of the sides of the churn-body A, and have tapering or conical holes formed through them, which holes are arranged with their larger ends forward, as shown in Figs. 1 and 2. The upper end of the bar M is detachably attached to the horizontally-projecting end of the standard P. The standard P is bent at right angles, or nearly at right angles, and passes down along the outer side of the churn-body A, and its lower end is made branched, and the ends of said branches are inserted in sockets attached to the bench D, so as to support the dasher M N O stationary, while the churn-body and its attachments are revolved.

By this construction, as the churn-body A is revolved, the milk is thrown by the paddles J and by centrifugal force against the sides of the churn-body A, where it encounters the perforated arms O of the stationary dasher M N O. Part of the milk passes through the holes of the arms O, the form of said holes increasing the friction. The rest of the milk is thrown back into the middle part of the churn-body A, to be again projected against its sides. When the butter is formed the stationary dasher is removed, and a few turns of the crank back and forth will gather the butter into a solid mass. The perforated plate I is then raised, taking all the butter with it, the milk flowing through the holes in the said plate into the lower part of the churn.

Having thus described my invention, I claim as new and desire to secure by Letters Patent—

1. The combination of the perforated plate I, paddles J, and standard K with the revolving churn-body A, substantially as herein shown and described, and for the purpose set forth.

2. The combination of the stationary dasher M N O with the standard P, revolving churn-body A, and paddles J, attached to the perforated plate I, substantially as herein shown and described, and for the purpose set forth.

3. The combination of the cylindrical churn-body A, provided with the perforated plate I, paddles J, and post K, with the plate B and its operating gearing C E F G H, with the bench D, and with the stationary dasher M N O P, substantially as herein shown and described, and for the purpose set forth.

CHARLES HUTCHINS.

Witnesses:
  M. T. CROSBY,
  H. E. BODNELL.